Patented Feb. 10, 1942

2,272,791

UNITED STATES PATENT OFFICE 2,272,791

CHROMIUM COMPOUNDS OF MORDANT TRIARYLMETHANE DYESTUFFS AND A PROCESS FOR THEIR MANUFACTURE

Achille Conzetti, Basel, and Otto Schmid, Muttenz, near Basel, Switzerland, assignors to the firm of J. R. Geigy S. A., Basel, Switzerland No Drawing. Application February 1, 1938, Serial No. 188,202. In Switzerland February 6, 1937

6 Claims. (Cl. 260—387)

It has been found that chromium-compounds of mordant triarylmethane dyestuffs, which if desired may also contain carboxylic acid groups and which are difficulty soluble or insoluble in the usual organic solvents, possess basic properties.

According to this invention use is made of these basic properties to cause these complex chromium-compounds of mordant triarylmethane dyestuffs to take up hydrochloric acid and form valuable new salt-like chromium-compounds, which may contain water solubilizing groups, which are easily or more easily soluble in organic solvents, by treating them with hydrochloric acid in the presence of organic solvents or suspension media, whereupon they become soluble in those organic solvents which contain hydroxyl-groups, for example the lower alcohols, or ethylene glycolmono-ethyl-ethers and -mono-acyl-esters, chlorhydrins, or ethyl lactate.

For the production of the new compounds the procedure is preferably such that the chromium-compounds of the corresponding mordant triarylmethane dyestuffs, which are insoluble or difficultly soluble in organic solvents, and which are obtained by being chromed according to the usual methods, are suspended in organic solvents containing hydroxyl groups, for example lower alcohols, and are stirred at temperatures of about 50° to 80° C. with hydrochloric acid until completely dissolved. By evaporating or distilling off the solvent, preferably at low temperature and under reduced pressure, there is obtained a powder, mostly with a metal gloss, which is very easily soluble, especially in lower alcohols.

The compounds obtained by the new reaction are characterized by their good solubility in organic solvents containing hydroxyl groups. They are particularly easily soluble in lower alcohols, in ethylene glycol -mono-alkyl-ethers and -mono-acyl-esters, in ethyl lactate, but are less soluble in glycerine. By reason of their very high degree of fastness to light, they should be used wherever excellent solubility in organic solvents or mixtures containing hydroxyl groups is necessary for particular purposes of use, for example in paper staining, for wood steeping and so forth.

The following examples, to which however the new reaction is not restricted, will serve to explain the method of operation, the parts being by weight.

*Example 1*

106 parts of the chromium-compound of Eriochrome Azurol B (Schultz, Farbstofftabellen 1931, No. 838), which are obtained as an insoluble violet-blue powder, by chroming 91.8 parts of the free dyestuff acid, suspended in 300 parts of alcohol, with 33 parts of sodium bichromate at increased temperature, are suspended in 500 parts of alcohol and whilst thoroughly stirring for about one hour at about 60° to 78° C. have added thereto in drops 50 parts of hydrochloric acid of 33 per cent strength, whereby the dye-metal compound passes completely into solution with a blue colour. By distilling off the alcohol and drying the residue at 40° C. under reduced pressure, there are obtained about 120 parts of a violet-blue powder with a yellow gloss, soluble above 10% in the cold in lower alcohols, and of which the varnish colourings are characterized by a very good fastness to light.

*Example 2*

106 parts of the insoluble chromium-compound of triphenyl-methane dye condensed from 1 molecule of p-dimethylamino-benzaldehyde with 2 molecules of o-cresotic acid, when stirred in 500 parts of alcohol at 60° to 78° C., and treated with 50 parts of nitric acid of 31 per cent strength added in drops within 60 minutes, produce a clear violet solution. By distilling off the alcohol and drying the residue in a vacuum there is obtained the new compound as a violet powder with a yellow gloss, which is soluble up to 10% or more in lower alcohols. Instead of nitric acid it is also possible to use hydrochloric acid.

*Example 3*

138 parts of the chromium-compound of Naphthochrome Green G (Schultz, Farbstofftabellen 1931, No. 851) are treated in 600 parts of alcohol at 60° to 78° C. whilst stirring for one hour with 50 parts of hydrochloric acid of 33 per cent strength added in drops, whereby the new compound with a green colour passes into solution. By distilling off the alcohol and drying the residue in a vacuum there are obtained 150 parts of a dark-green powder, soluble up to 10% and more in ethyl alcohol, and colouring cellulose ester varnishes green of very good light fastness.

*Example 4*

5.8 parts of the chromium-compound of the triphenyl-methane dyestuff from 1 molecule of 2-chloro-5-sulpho-benzaldehyde, condensed with 2 molecules of o-cresotic acid, which is obtained by chroming the sodium salt in water with chromium acetate or in alcohol with bichromate, as a water soluble compound, which however is entirely insoluble in organic solvents, are suspended in 40 parts of alcohol and at 60° to 65° C. are treated, whilst stirring, for 45 minutes with 3.5 parts of hydrochloric acid of 33 per cent strength added in drops. All passes into solution with a blue colour. After expelling the alcohol there is obtained a violet glossy powder of good solubility in lower alcohols.

The chromium-compound of the dyestuffs Chrome Azurol S (Schultz, Farbstofftabellen 1931, No. 841), Eriochrome Cyanine R (Schultz, Farbstofftabellen 1931, No. 840) behave in the same way.

Instead of the dyestuffs named in the above examples, there may also be used with similar results the chromium-compounds of the triarylmethane dyestuffs enumerated in the U. S. Patent No. 2,050,921.

What we claim is:

1. A process for the production of new chromium-compounds of mordant dyestuffs with increased solubility in organic solvents containing hydroxyl groups, consisting in treating by heating in a substantially anhydrous organic medium complex chromium-compounds of mordant triarylmethane-dyestuffs which are substantially insoluble in organic solvents containing hydroxyl groups and which are obtained by known chroming methods, with hydrochloric acid.

2. A process for the production of a new chromium-compound of Eriochrome Azurol B with increased solubility in organic solvents containing hydroxyl groups, consisting in treating by heating in strong alcohol the complex chromium-compound of Eriochrome Azurol B, obtained by known chroming methods and which is substantially insoluble in organic solvents containing hydroxyl groups, with concentrated hydrochloric acid until the new dye-metal compound passes entirely into solution with a blue colour.

3. A process for the production of a new chromium compound of Naphthochrome Green G with increased solubility in organic solvents containing hydroxyl groups, consisting in treating by heating in strong alcohol the complex chromium-compound of Naphthochrome Green G, obtained by known chroming methods and which is substantially insoluble in organic solvents containing hydroxyl groups, with concentrated hydrochloric acid until the new dye-metal-compound passes entirely into solution with a green colour.

4. The salts of basic complex chromium-compounds of mordant dyestuffs of the triarylmethane class with hydrochloric acid, being coloured products soluble in excess of 10% in lower alcohols.

5. The salt of the basic complex chromium-compound of Eriochrome Azurol B with hydrochloric acid, being a violet-blue powder with a yellow gloss, soluble above 10% in the cold in lower alcohols and colouring varnishes in shades of very good fastness to light.

6. The salt of the basic complex chromium-compound of Naphthochrome Green G with hydrochloric acid, being a dark green powder soluble in excess of 10% in lower alcohols and colouring cellulose ester varnishes green of very good light-fastness.

ACHILLE CONZETTI.
OTTO SCHMID.